(12) United States Patent
Okayama et al.

(10) Patent No.: US 10,755,601 B2
(45) Date of Patent: Aug. 25, 2020

(54) CATHETER SIMULATOR

(71) Applicants: OSAKA UNIVERSITY, Suita-shi, Osaka (JP); JMC CORPORATION, Yokohama-shi, Kanagawa (JP)

(72) Inventors: Keita Okayama, Suita (JP); Shinsuke Nanto, Suita (JP); Yasushi Sakata, Suita (JP); Daichi Watanabe, Yokohama (JP); Makoto Inada, Yokohama (JP); Munekuni Sato, Nishitokyo (JP)

(73) Assignees: OSAKA UNIVERSITY, Suita-Shi, Osaka (JP); JMC CORPORATION, Yokohama-Shi, Kanagawa (JP)

( * ) Notice: Subject to any disclaimer, the term of this patent is extended or adjusted under 35 U.S.C. 154(b) by 483 days.

(21) Appl. No.: 15/388,203

(22) Filed: Dec. 22, 2016

(65) Prior Publication Data
US 2017/0103682 A1    Apr. 13, 2017

Related U.S. Application Data

(63) Continuation of application No. PCT/JP2014/079683, filed on Nov. 10, 2014.

(51) Int. Cl.
*G09B 23/30* (2006.01)
*G09B 23/28* (2006.01)
(Continued)

(52) U.S. Cl.
CPC .......... *G09B 23/303* (2013.01); *G06T 7/0012* (2013.01); *G09B 9/00* (2013.01);
(Continued)

(58) Field of Classification Search
CPC .................................................... G09B 23/303
(Continued)

(56) References Cited

U.S. PATENT DOCUMENTS

2002/0178845 A1* 12/2002 Jaszczak ............... G01R 33/58
73/866.4
2005/0186361 A1  8/2005 Fukuda et al.
(Continued)

FOREIGN PATENT DOCUMENTS

CN        1653504 A      8/2005
CN      102915664 A      2/2013
(Continued)

OTHER PUBLICATIONS

Europe Patent Office, "Search Report for European Patent Application No. 14906024.6," dated Mar. 2, 2018.
(Continued)

*Primary Examiner* — Thomas J Hong
(74) *Attorney, Agent, or Firm* — Manabu Kanesaka (57) ABSTRACT

A catheter simulator (10) of the invention has a container (20) filled with a liquid; an elastic heart model (30) installed in a floating state in the liquid with which the container (20) is filled; and a pump (50) connected to the heart model (30). The pump (50) is connected to an apex section of the heart model and produces a pulsatile flow from the apex section toward an aorta. Coronary arteries (33) provided on the surface of a main body (30A) of the heart model (30), pulsate together with the main body as a result of the pulsatile flow flowing from the pump (50).

12 Claims, 5 Drawing Sheets

(51) Int. Cl.
     *G09B 9/00*      (2006.01)
     *G06T 7/00*      (2017.01)
     *G09B 23/32*      (2006.01)

(52) U.S. Cl.
     CPC .. *G09B 23/285* (2013.01); *G06T 2207/30048* (2013.01); *G09B 23/32* (2013.01)

(58) Field of Classification Search
     USPC .......................................................... 434/268
     See application file for complete search history.

(56) References Cited

U.S. PATENT DOCUMENTS

| | | | |
|---|---|---|---|
| 2013/0196301 A1 | 8/2013 | Carson et al. | |
| 2015/0161347 A1* | 6/2015 | Christiansen | G09B 23/303 |
| | | | 703/9 |

FOREIGN PATENT DOCUMENTS

| | | |
|---|---|---|
| DE | 202004006035 U1 | 8/2004 |
| JP | 2000-042118 A | 2/2000 |
| JP | 2013-213986 A | 10/2013 |
| JP | 2014-170075 A | 9/2014 |

OTHER PUBLICATIONS

China Patent Office, "Office Action for Chinese Patent Application No. 201480080010.9," dated Dec. 5, 2018.
PCT/ISA/210, "International Search Report for International Application No. PCT/JP2014/079683," dated Feb. 10, 2015.

\* cited by examiner

CATHETER SIMULATOR

RELATED APPLICATIONS

The present application is a Continuation Application of PCT International Application No. PCT/JP2014/079683 filed Nov. 10, 2014, the disclosure of which is incorporated herein.

TECHNICAL FIELD

The present invention relates to a catheter simulator and an imaging method for a catheter simulator.

BACKGROUND ART

Conventionally, in clinical practice, a method of inserting a catheter through an artery of an arm or a leg and bringing the catheter to an organ, is used for the purpose of performing an examination or a treatment for an organ such as heart. In regard to this catheter manipulation, various simulators have been proposed to promote acquisition or mastery of the operation techniques. In addition to the training by means of computer simulators, simulators with which training practice resembling the actual feeling of catheter operation can be realized, have been suggested in recent years.

For example, Patent Document 1 discloses a training apparatus (simulator) that circulates a simulated blood (liquid) using a simulated organ and simulated blood vessels, which have elasticity and the like of the same degree as that of biological organs. It is described that by circulating a liquid, the labor required for the preparations or clean-up associated with the training can be reduced. Furthermore, training of a catheter operation based on X-ray imaging is enabled. It is also described that in the case of using a treatment unit that imitates the heart (heart model), the heart model can be caused to exhibit a movement close to pulsation (periodical contractile motion) by periodically varying the amount of supply of the liquid flowing into the heart model. Thereby, a training more closely resembling the reality can be carried out.

CITATION LIST

Patent Document

Patent Document 1: JP 2014-170075 A

SUMMARY OF THE INVENTION

Problem to be Solved by the Invention

In catheter simulation for a heart model, training in relation to the coronary arteries having a large number of fine blood vessels having complicated shapes, is mainly emphasized. In that case, in the prior art technologies described above, since a structure in which a liquid (simulated blood) is supplied from the aorta side to the coronary arteries is employed, a situation different from the actual blood flow in the heart area occurs. As the result, it becomes difficult to realize a blood flow in the coronary arteries and a blood flow rate that are similar to those in the human body, and therefore, training cannot be carried out in the same conditions as the catheter manipulation that is actually practiced with regard to the human body. Furthermore, since a structure is employed in which a liquid is circulated inside the main body of heart by connecting a supply pipe and a discharge pipe to the main body, and a liquid is supplied into the main body also through the coronary arteries, unnatural flow may occur inside the main body, or a flow going back to the coronary arteries may occur. Accordingly, when a catheter is inserted into a coronary artery, there is a need to cope with the unnatural flow that is not observed in the actual human body.

Furthermore, in the prior art technologies, the amount of supply of the liquid flowing into a heart model is periodically varied in order to cause the heart model to pulsate. In order to control this amount of supply, components such as an electronic valve, a pressure sensor, and an electronic valve controller are used, and there is a problem that the structure of the simulator becomes complicated.

The actual catheter operation is carried out while an X-ray contrast agent is injected through a catheter, and the position, shape or the like of a blood vessel is checked by X-ray imaging. Therefore, in the prior art technologies, it is suggested that a simulator is provided with an X-ray imaging system, and a catheter operation training is performed under X-ray illumination. However, it would be convenient if a simulation closer to the reality could be achieved by visual inspection, even in a condition that X-ray imaging is not used. It is because, if training can be carried out without being restricted by whether the place is under X-ray control, the time, labor and cost required for preparations and the like can be reduced, and the risk of unnecessary exposure to radiation during training can be avoided. That is, a simulator with which the use of X-ray imaging can be selected depending on the stage or content of training is desirable.

However, in a case in which a training resembling the reality is put into practice under visual inspection, there is a problem with visually recognizing a contrast agent for angiography. Since iodine-based X-ray contrast agents that are conventionally used for angiography are colorless and transparent, when a colored ink or the like is used as a simulated X-ray contrast agent (injection agent), the injection agent remains within the heart model or the simulated blood vessels. Thus, in a case in which training is repeatedly carried out, visibility is deteriorated. Therefore, when the frequency of use of the injection agent is increased, and the residual amount of the injection agent within the heart model and the simulated blood vessels increases, it becomes difficult to continue training.

The present invention was achieved as a result of paying attention to the problems described above, and it is an object of the invention to provide a catheter simulator having a convenient configuration, which suppresses unnatural flow of a simulated blood (liquid) occurring in the coronary arteries and reduces the number of components required for producing pulsatile flow as far as possible. Furthermore, it is another object of the present invention to provide an imaging method for a catheter simulator, by which retention of a simulated X-ray contrast agent (injection agent) in the heart model is eliminated, and training is not hindered even under visual inspection.

Means for Solving Problem

In order to achieve the object described above, the catheter simulator related to the present invention has a container filled with a liquid; an elastic heart model that is installed in the container in a state of being filled with a liquid, and is provided with coronary arteries and an aorta; and a pump that is connected to an apex section of the heart model and generates a pulsatile flow from the apex section toward the aorta using the liquid.

The heart model in the catheter simulator has, similarly to an actual human heart, an aorta; and coronary arteries (left coronary artery and right coronary artery) branched from the basal part of the aorta and extending along the surface of the main body of heart. The heart model is installed inside a container filled with a liquid (simulated blood), and a pulsatile flow (flow of a liquid that causes pulsation of the heart model) is produced by a pump from an apex section (distal end on the foot side of the heart) toward an aorta. The heart model is formed from an elastic material, and as a liquid flows from the apex side to the aorta, a liquid is supplied into the coronary arteries by means of a heartbeat similar to that of a human heart. Thereby, an unnatural flow that is unobservable in the human body cannot occur in the heart main body and the coronary arteries, and a coronary blood flow in the same direction as in the case of performing an actual heart catheter operation is reproduced.

The pump that produces a pulsatile flow is connected to an apex section of the heart model, and the pulsatile flow that has flowed from the pump into the main body of heart, reaches the aorta. The heart model pulsates in a state of floating in the liquid with which the container is filled.

Regarding the pump, the pump itself can produce a pulsatile flow. Therefore, there is no need for components such as an electronic valve, a pressure sensor and an electronic valve controller in the catheter simulator, and so the simulator is simplified. Thus, even under X-ray illumination, unnatural shadows caused by these components are not photographed.

Furthermore, in order to enable training under visual inspection by eliminating retention of a simulated X-ray contrast agent, which is one of the objects described above, the imaging method for a catheter simulator related to the present invention is used for a catheter simulator having a heart model that is installed in a container in a state of being filled with a liquid, and is provided with coronary arteries and an aorta. The imaging method is characterized in that an injection agent coming through a catheter inserted into one of the coronary arteries and the liquid are subjected to a chemical reaction, and the color of the injection agent is changed to the same color as that of the liquid.

The injection agent injected through the catheter by the imaging method described above undergoes a chemical reaction with the liquid within a short time period after injection so that the agent undergoes color change to the same color as that of the liquid. Therefore, a trainee has no need to mind retention of the injection agent within the heart model and the simulated blood vessels, and training of the catheter operation can be carried out while injecting the injection agent several times. Furthermore, since the liquid is not subject to discoloration or cloudiness, training can be carried out continuously without exchanging the liquid.

Meanwhile, the term "imaging" according to the present invention means that a state in which a trainee can comprehend the state of blood vessels (coronary arteries and the like) of a heart model, is brought about. That is, according to the present invention, a method of allowing a trainee to comprehend (comprehending by viewing a monitor or the like) the state of blood vessels by irradiating blood vessels with X-radiation and comprehending the morphology of the blood vessels; and a method of comprehending the morphology of blood vessels by directly inspecting the heart model without irradiating X-radiation, are included.

Effect of the Invention

When the catheter simulator of the present invention is used, catheter simulation can be carried out with a coronary artery blood flow that reproduces the flow of blood similarly to the actual heart catheter operation. Furthermore, simulation under visual inspection can be carried out such that training is not hindered even if a simulated X-ray contrast agent is continuously used, by eliminating retention of the simulated X-ray contrast agent in the heart model and the simulated blood vessels.

MODE(S) FOR CARRYING OUT THE INVENTION

Hereinafter, embodiments of the present invention will be described with reference to the drawings.

Figure 1:
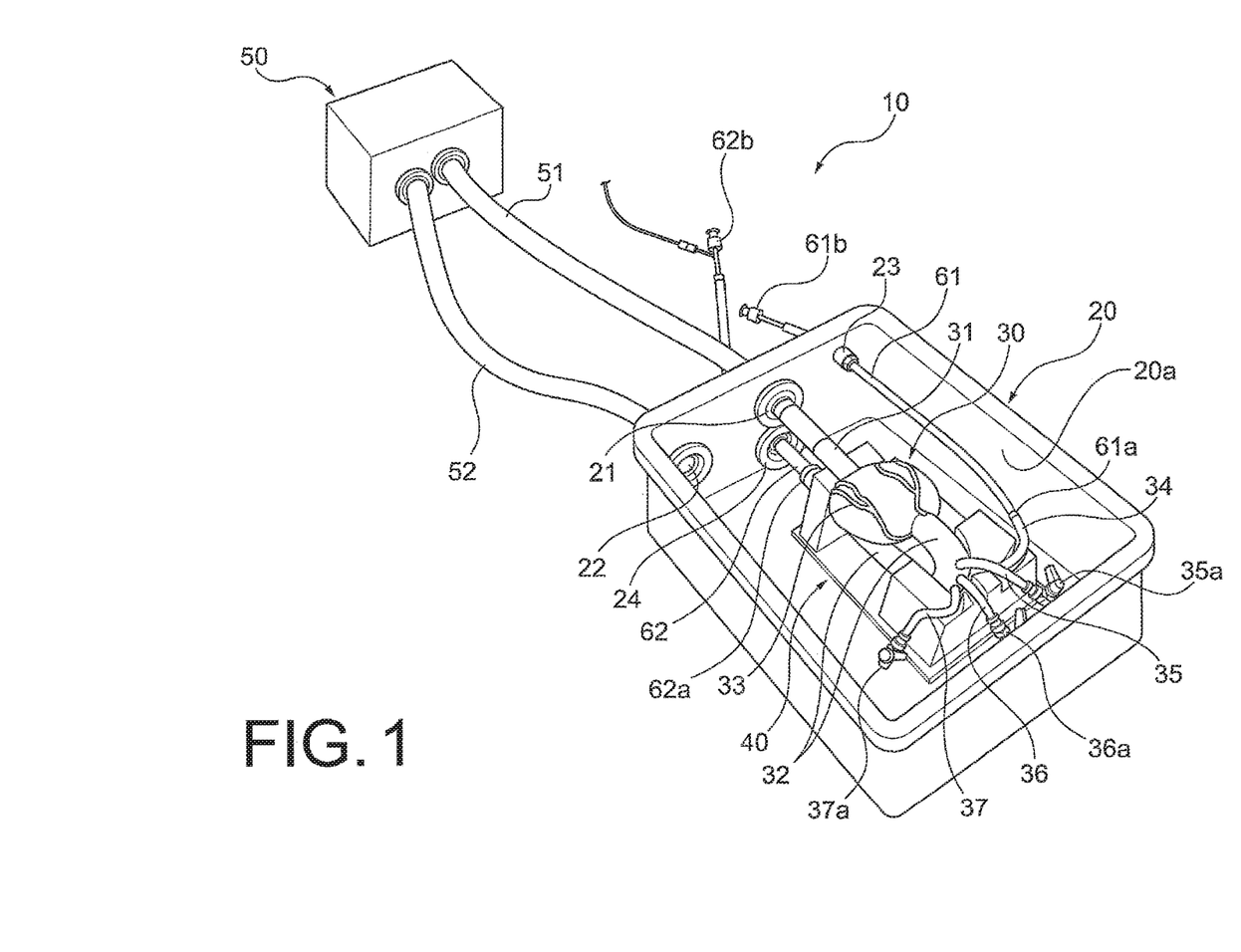
FIG. 1 is an overall outline diagram illustrating an embodiment of the catheter simulator related to the present invention.

FIG. 1 is an overall outline diagram illustrating an embodiment of the catheter simulator related to the present invention. First, the overall configuration of the catheter simulator will be described with reference to FIG. 1.

A catheter simulator 10 of the present embodiment has a container 20 filled with a liquid; a heart model 30 installed in the liquid with which the container 20 is filled; and a pump 50 connected to the heart model 30, which are arranged as illustrated in, for example, FIG. 1.

The container 20 includes an accommodating section 20a in which a liquid is accommodated in a rectangular shape or in a shape that is rounded so as to make it difficult to be photographed under X-ray illumination. Furthermore, the container 20 has a strength sufficient for stably accommodating the liquid. It is preferable that the upper side of the container 20 is opened, or has a lid that can be opened or closed. Thereby, on the occasion of making preparations or clean-up for training, such as an operation of filling the accommodating section 20a with a liquid, an operation of installing the heart model 30 in the liquid, or an operation of connecting the heart model 30 to a pump 50, the operations can be efficiently performed through the opening at the top face of the container. Meanwhile, the container 20 may also have, at a lower lateral face or at the bottom, a discharge port (not illustrated in the diagram) for discharging the liquid within which the container is filled. Thereby, the liquid can be efficiently discharged from the container 20 at the time of clean-up.

On the occasion of performing simulation, the heart model 30 is installed at a predetermined position of the accommodating section 20a. The accommodating section 20a is filled with a liquid (not illustrated in the diagram). This liquid has a function as blood (simulated blood) that circulates through the heart model. For example, transparent water can be used. Alternatively, this liquid may have a property, as will be described below, of undergoing a chemical reaction with an injection agent that is injected through a catheter and changing the color of the injection agent to the same color as that of the liquid. Furthermore, on the occasion of performing the simulation, it is preferable to fill the accommodating section 20a with the liquid to a height higher than or equal to the height of the heart model 30 installed therein.

Provided on one lateral face of the container 20 of the present embodiment is an inflow port 21 that allows a supply pipe 51 to pass therethrough, the supply pipe 51 being intended for causing a liquid to flow in from the pump 50. Furthermore, on the same lateral face, a discharge port 22 for discharging the liquid inside the accommodating section 20a toward the pump 50 side. Furthermore, provided on the same lateral face are an inlet section 23 that allows an inlet tube 61 to pass therethrough, the inlet tube 61 introducing a catheter that is operated by a trainee from the outside of the container 20; and an inlet section 24 that allows an inlet tube 62 to pass therethrough. Here, it is not definitely necessary for the inflow port 21, the discharge port 22, and the inlet sections 23 and 24 to be disposed on the same lateral face. The supply pipe 51 and the inlet tubes 61 and 62 may also be introduced into the inner side of the container 20 through the top face opening of the container 20, without providing the inflow port 21 and the inlet sections 23 and 24.

The inlet tube 61 is connected, as will be described below, to aright subclavian artery 34 that is linked to an aorta 32 provided in the heart model 30, through a connecting section 61a. The liquid inside the container 20 passes through the aorta 32 and the right subclavian artery 34 and also fills the inlet tube 61. The inlet tube 61 has a catheter inlet terminal 61b at a distal end on the external side of the container 20. The inlet terminal 61b has a function of preventing the liquid with which the inlet tube 61 is filled, from leaking to the outside (valve function). Furthermore, the inlet terminal 61b has a structure in which a trainee introduces a catheter into the inlet tube 61 and pulls out therefrom.

The inlet tube 62 is connected, as will be described below, to a connecting section 62a provided at a distal end on the caudal side of the aorta 32 (constituting a part that is linked to a blood vessel at the crotch). Furthermore, the inlet tube 62 has a catheter inlet terminal 62b at a distal end on the external side of the container 20. The inlet terminal 62b has the same structure as that of the inlet terminal 61b.

In a case in which a trainee inserts a catheter through the inlet tube 61, a training of inserting a catheter through an artery in an arm can be simulated. Furthermore, in a case in which a catheter is inserted through the inlet tube 62, a training of inserting a catheter through an artery at the groin (crotch) can be simulated.

Next, the heart model 30 installed inside the accommodating section 20a of the container 20 will be described with reference to FIG. 2 and FIG. 4.

The heart model 30 of the present embodiment includes a main body 30A having a distorted spherical form simulating a human heart. In this case, an actual human heart includes a left ventricle, a right ventricle, a left atrium and a left atrium; however, the main body 30A does not include such an internal structure, and the interior forms a cavity.

Figure 2:
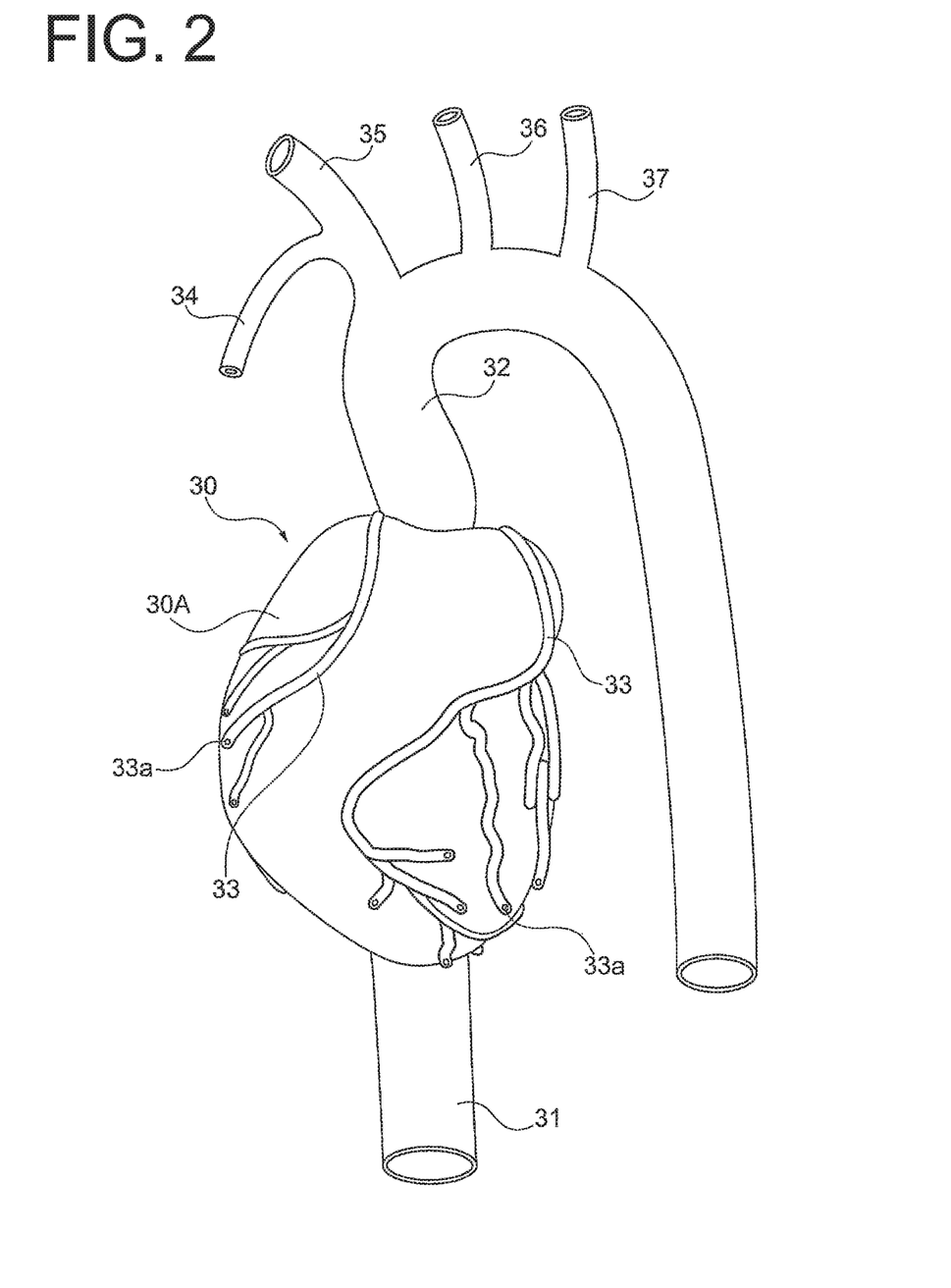
FIG. 2 is a diagram illustrating a heart model used for the catheter simulator illustrated in FIG. 1.

As illustrated in FIG. 2, at a distal end on the head side of the main body 30A of the heart model 30, an aorta 32 is provided as in the case of a human heart. Furthermore, an inflow tube 31 is provided at an apex section, which is a distal end on the caudal side of the main body 30A. The inflow tube 31 does not exist in the human body; however, according to the present embodiment, the inflow tube 31 is connected to the supply pipe 51 of the pump 50 that passes through the inflow port 21, and has a function of causing the liquid sent from the pump 50 (pulsatile flow) to flow into the main body 30A. Accordingly, the liquid that has flowed into the main body 30A through the inflow tube 31 passes through the interior of the cavity with certain directionality, and directly flows out to reach the aorta 32.

On the surface of the main body 30A, a number of coronary arteries 33 are provided as in the case of a human heart. Since coronary arteries are fine and have complicated shapes, the difficulty of the catheter operation is high, and coronary arteries are places where training is mainly centered. These coronary arteries are branched from the basal part of the aorta 32, and are provided along the surface of the main body 30A. Meanwhile, according to the present embodiment, discharge ports 33a are formed in a distal end region of the coronary arteries 33, and the liquid that has flowed into the coronary arteries 33 is discharged to the outside (outside of the main body 30A) through the discharge ports 33a.

It is preferable that a simulated body of blood vessels that are connected to the aorta in a human body is provided on the path of the aorta 32 described above. According to the present embodiment, the simulated blood vessels illustrated in FIG. 1, FIG. 3 and FIG. 4, specifically, a right subclavian artery 34, carotid arteries 35 and 36, and a left subclavian artery 37 are provided similarly to the human body. The right subclavian artery 34 is an inlet path for a catheter that is introduced through an arm as described above. The catheter operated by the trainee reaches from the right subclavian artery 34 to the aorta 32, and is inserted into the coronary arteries 33 that are branched at the basal part. Furthermore, in FIG. 1 and FIG. 3, the aorta 32 extending to the backside of the main body 30A reaches the femoral artery that runs through the groin. The aorta 32 extending to the backside of the main body 30A becomes an inlet path for the catheter that is introduced through the groin.

The heart model 30, the simulated blood vessels connected to the heart model 30 (for example, aorta 32, coronary arteries 33, right subclavian artery 34, carotid artery 35 and 36, and left subclavian artery 37), and the inflow tube 31 are formed from materials having elasticity closer to that of an actual human heart. That is, since the main body 30A is formed from an elastic material, when a pulsatile flow is passed inside the main body 30A from the heart apex section toward the aorta, the main body 30A itself repeatedly undergoes expansion and contraction. Accordingly, blood (liquid) can be sent out, similarly to an actual heart. Examples of such an elastic material include PVA (polyvinyl alcohol), polyurethane, epoxy resins, unsaturated polyesters, phenolic resins, silicones or materials similar to these, other thermosetting resins, and thermoplastic resins, which are used singly or in combination of multiple kinds. By using such an elastic material, training of a catheter operation with a tactile sensation close to the organs of a human body is enabled.

Furthermore, in regard to the heart model, the trainee can observe the movement of a catheter to be inserted, a guide wire, and other devices directly by visual inspection, by producing the heart model using a transparent or translucent material. The behavior exhibited by an injection agent that is injected through the catheter is also can be visually recognized. That is, a cardiac catheter test and a treatment can be simulated by linking the operation at hand with the movement of the catheter tip. Even though in a case that a heart model 30 is produced using a material which can be visually recognized by a trainee, when the container 20 is covered with a lid or the like so that the heart model cannot be visualized, or the heart model is displayed on a monitor or the like by illumination with X-rays, the behavior of the catheter can be comprehended only through the monitor.

It is also preferable that the heart model 30 and the simulated blood vessels connected to the heart model 30 as described above are produced integrally without artificial joints. Thereby, a blood flow that is not observable in the human body being generated by the joints can be prevented. Also, the viewing field being blocked by the joints at the time of inserting a catheter can be prevented, and the appearance of unnatural shadows under X-ray illumination can be avoided.

Regarding a method for integrally producing the heart model 30 and the simulated blood vessels connected to the heart model using a material that satisfies the properties such as described above, for example, the optical stereolithographic method (Japanese Patent No. 5236103) invented by the present applicant can be used. When the stereolithographic method is used, a highly precise heart model for each patient can be produced at a relatively low cost for a short period of time, based on the imaging data of a human organ (heart CT data). Therefore, a trainee can attempt, prior to an actual surgery, a simulated training for the catheter operation considering the vascular structure or diseased site inherent to a patient can be achieved. Furthermore, the catheter simulator related to the present invention can be utilized for a preliminary preparation before an actual catheter operation, by selecting and examining a catheter optimal for a patient or various devices before an examination or a surgery. Thereby, reduction of risks for vascular injury, cerebral embolism or the like concomitant to the replacement of catheters, and an increase in surgical successes obtainable by selecting a catheter suitable for the anatomical characteristics of the blood vessels of a patient, can be anticipated. Furthermore, it is also contemplated that appropriate selection of the catheter also contributes to lowering of medical costs as a result of suppressing the use of unnecessary medical instruments including catheters.

The carotid arteries 35 and 36, and the left subclavian artery 37 of the present embodiment are respectively provided with flow rate-regulating valves 35a, 36a, and 37a. As described above, when a liquid that pulsates in the main body 30A flows in from the pump 50 through the inflow tube 31, the liquid flows into the aorta 32 (a portion flows through the coronary arteries 33), and then directly through carotid arteries 35 and 36, and the left subclavian artery 37. As described above, since catheter inlet tubes 61 and 62 that are respectively connected to a right subclavian artery 34 and the aorta 32 extending to the groin, are provided with inlet terminals 61b and 62b having a valve function, the speed or pressure of a pulsatile flow can be easily adjusted by providing flow rate-regulating valves 35a, 36a and 37a at the blood vessel parts described above. Meanwhile, the flow rate-regulating valves 35a, 36a and 37a are not necessarily essential. It is acceptable that all of the flow rate-regulating valves 35a, 36a and 37a are opened, or any one or two of them are installed.

The heart model 30 described above is installed, as illustrated in FIG. 1, at a predetermined position in the accommodating section 20a using a holder 40. That is, the heart model 30 is installed at a predetermined position in the accommodating section 20a in a state of being mounted on the holder 40, and the accommodating section 20a is filled with a liquid in this state. Here, the configuration of the holder 40 will be described with reference to FIG. 3.

Figure 3:
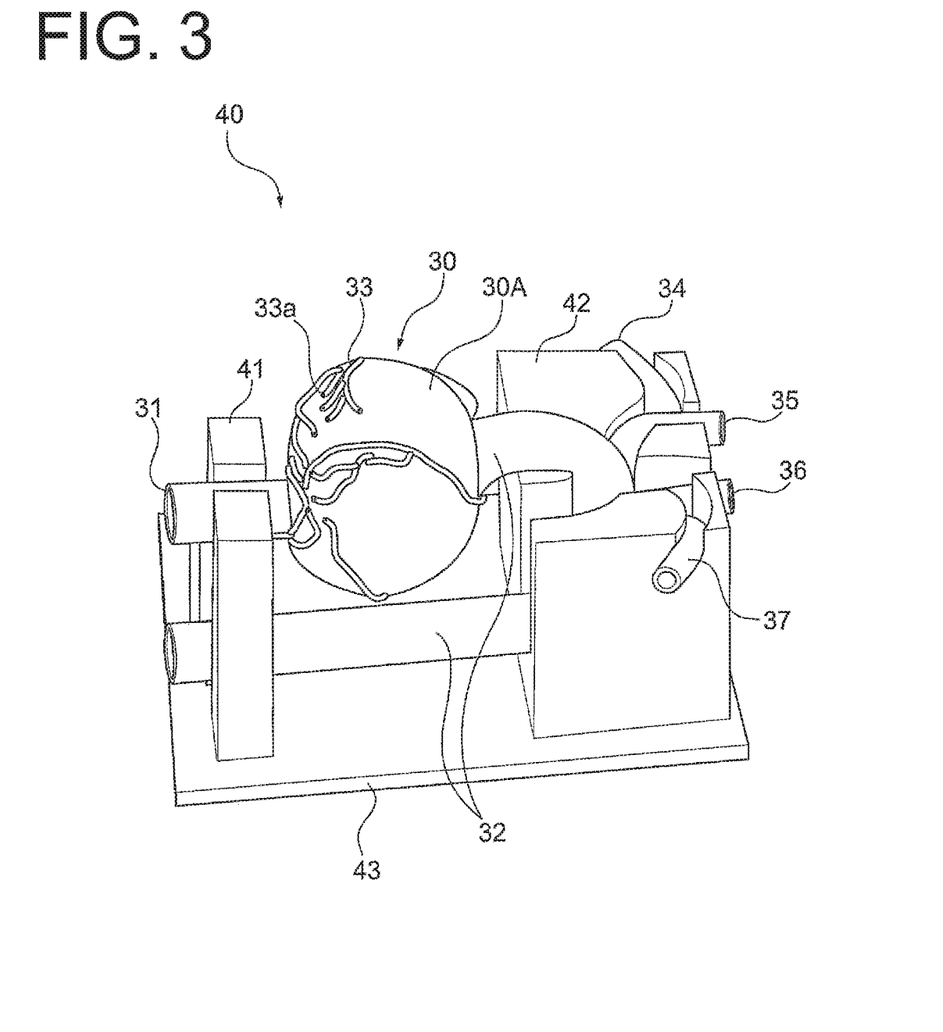
FIG. 3 is a diagram illustrating a holder that retains the heart model used for the catheter simulator illustrated in FIG. 1.

The holder 40 according to the present embodiment retains the heart model 30 such that the main body 30A floats in the liquid. Specifically, so as to make the main body 30A float by retaining the apex section side and the aorta side of the heart model 30, the holder 40 includes a retaining section 41 that retains the inflow tube 31 provided at the apex section, a retaining section 42 that retains the aorta 32, and a support base 43 to which the retaining sections 41 and 42 are fixed. In this case, the retaining section 41 also retains the aorta 32 that bends on the backside of the main body 30A. The retaining section 42 also retains other simulated blood vessels (right subclavian artery 34, carotid arteries 35 and 36, and left subclavian artery 37) that are connected to the aorta 32. The support base 43 is provided in a state of being fixed to the bottom of the container 20 so that its position is not shifted by the pressure of the liquid flowing into the main body 30A and the various simulated blood vessels. Here, it is not necessary that the support base is in a state of being fixed all the time. For example, by providing one or multiple key-type protrusions at the bottom, the support base can be easily installed and removed. Thereby, preparation, accommodation and cleaning can be achieved conveniently.

When the heart model 30 is retained in such a state, the main body 30A of the heart model 30 is in a state of floating in the liquid. By the pulsatile flow flowing in from the pump 50 that is connected to the heart model 30 floating in the liquid, the heart model can be caused to pulsate similarly to an actual heart. Furthermore, since the coronary arteries 33 provided on the surface of the main body 30A also pulsate integrally with the main body 30A, a catheter operation training conforming to an actual catheter surgery in relation to the pulsating heart and the coronary arteries can be carried out.

The pump 50 that is connected to the heart model 30 is intermittently driven so as to generate a pulsatile flow in the liquid. The pump 50 has a function of circulating the liquid inside the container 20 by receiving the liquid filled in the container 20, through the discharge port 22, and sending the liquid out through the supply pipe 51 at a predetermined pressure. For example, the pump can be configured into a circulating type pump in which a liquid is sent out by driving a piston in a reciprocating manner by means of a driving motor. In this case, the amount of the liquid to be sent by one pulse (corresponding to the blood pressure) can be changed by changing the stroke of the piston that is driven in a reciprocating manner. Also, the period of heartbeat (corresponding to the cardiac rate) of the heart model can be changed by changing the duration of one reciprocating motion of the piston. Specifically, a pulsatile flow close to an actual human body can be generated by outputting a pressure of 300 mmHg at the maximum 20 to 200 times per minute. A similar pulsatile flow can also be produced by a capacity-change type pump such as a lobed pump or a tube pump. As such, since the pump 50 itself produces a pulsatile flow, the pump 50 does not require components for producing a pulsatile flow from a steady flow inside the present catheter simulator, for example, an electronic valve, a pressure sensor, and an electronic valve controller. Meanwhile, if the pressure at which the pump sends out the liquid is more than 300 mmHg, the pulsatile flow becomes different from the pulsation of an actual human heart; therefore, it is preferable to set the pressure to be 300 mmHg at the maximum. That is, by adjusting the pressure in the range of 0 mmHg to 300 mmHg, a pulsating state appropriate for each patient (for the case of each patient) can be set up.

Next, the liquid flow in the catheter simulator of the present embodiment and a training method for a catheter will be described with reference to FIG. 4 and FIG. 5.

Figure 4:
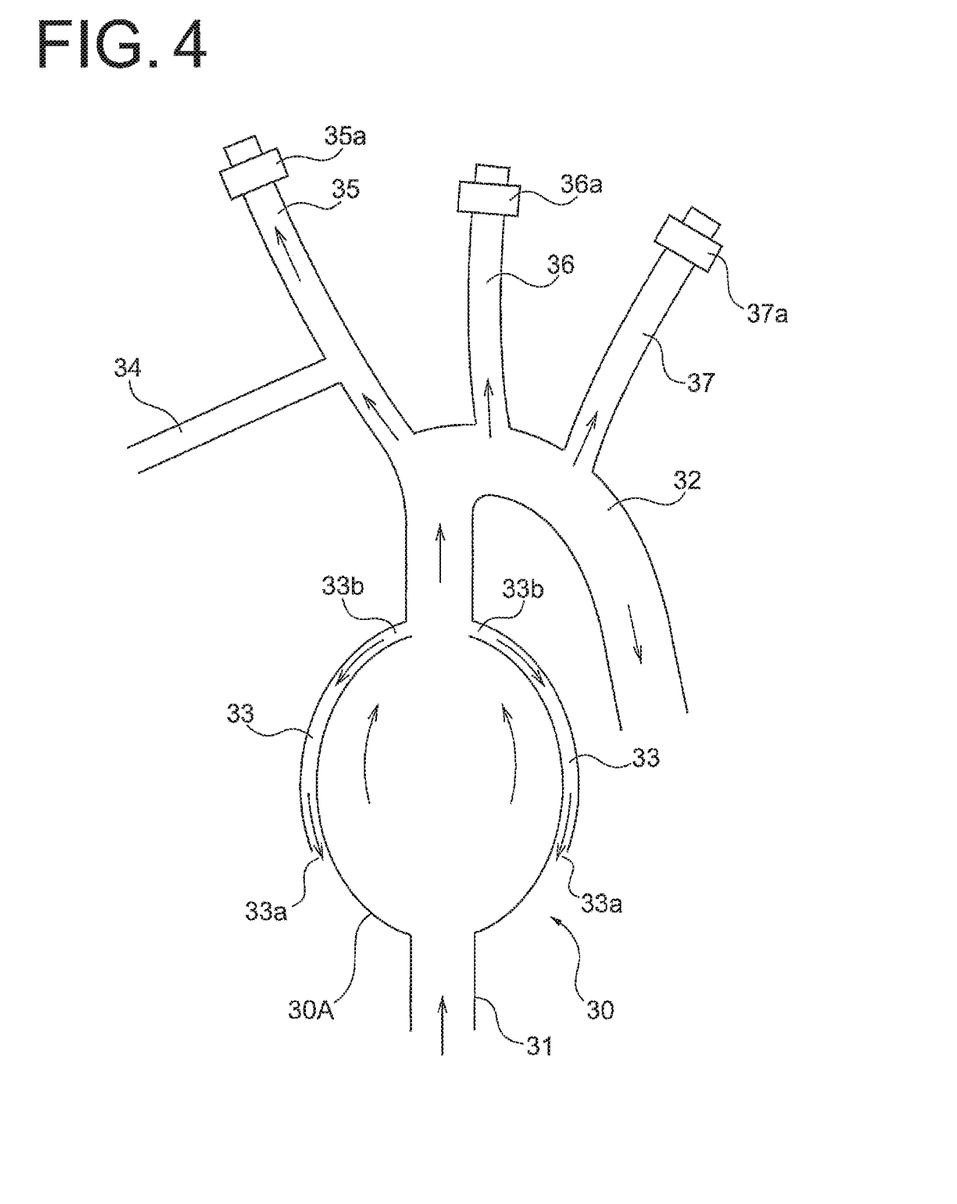
FIG. 4 is an explanatory diagram schematically illustrating the flow of a liquid within a heart model, the flow being generated by a pump used for the catheter simulator illustrated in FIG. 1.
Figure 5:
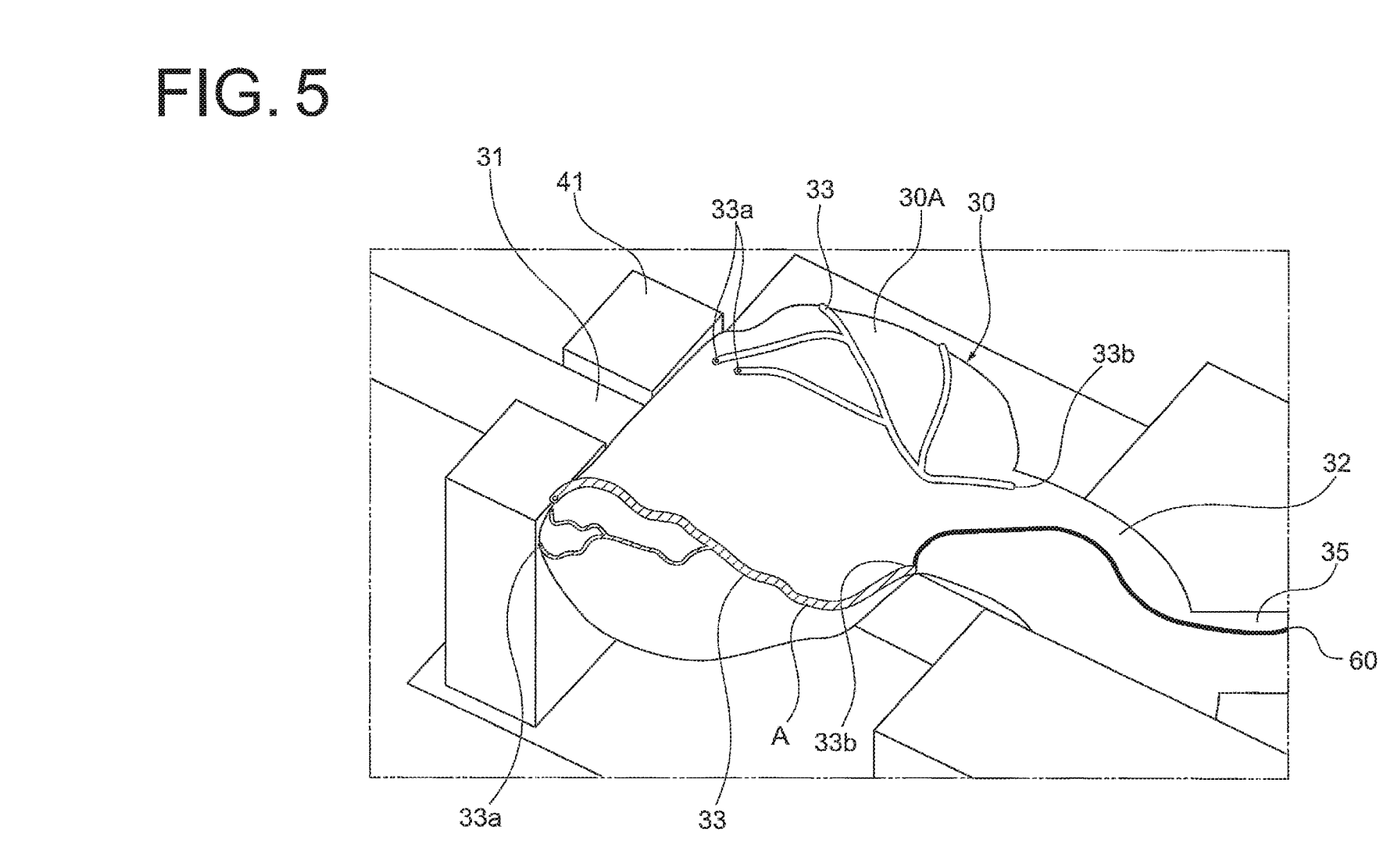
FIG. 5 is an outline diagram describing the state of having a catheter inserted into the catheter simulator related to the present invention and an imaging method for a coronary artery.

As illustrated in FIG. 4, the liquid sent out from the pump 50 and flowing into the main body 30A of the heart model 30 through the inflow tube 31 is such that a portion thereof flows into the coronary arteries 33, and the remaining portion reaches the aorta 32. The liquid flowing into the coronary arteries 33 is discharged to the outside of the heart model 30 through the discharge ports 33a provided at the distal end of the coronary arteries 33 and joins the liquid filled in the container 20. On the other hand, the liquid flowing into the aorta 32 is discharged into the container 20 through the carotid arteries 35 and 36 and the left subclavian artery 37, which are blood vessels provided on the path of the aorta 32, and joins the liquid filled in the container 20. The liquid discharged from the coronary arteries 33, the carotid arteries 35 and 36, and the left subclavian artery 37 into the container 20 flows out through the discharge port 22 and is circulated into the pump 50.

As described above, since the pulsatile flow from the pump 50 goes through from the apex section toward the aorta 32 side in one direction, a physiological blood flow can be reproduced. Also, since the liquid flowing into the coronary arteries 33 is discharged to the outside through the discharge ports 33a provided at the distal ends, a flow that is the same as the actual blood flow is produced inside the coronary arteries, and also, there is no unnatural flow occurring within the main body 30A. Furthermore, when the flow rate-regulating valves 35a, 36a and 37a provided at the carotid arteries 35 and 36 and the left subclavian artery 37 are finely regulated in this flow state, the pressure or flow rate of the liquid flowing into the heart model 30 and the blood vessels connected to the heart model 30 can be regulated. That is, although the blood flow in the human body may slightly vary in the pressure or flow rate in different patients; however, a blood flow rate inside the coronary arteries similar to that in the human body can be easily reproduced by adjusting the flow rate-regulating valves 35a, 36a and 37a as necessary. Thereby, simulation can be implemented in an environment closer to the reality.

The method for performing a catheter operation training with the simulated blood flow described above will be explained. First, as a preparation, in a state of having the container 20 filled with a liquid, the holder 40 is disposed in the accommodating section 20a of the container 20, and the heart model 30 and simulated blood vessels are installed on the holder 40. At that time, the liquid is allowed to fill the heart model 30 and the simulated blood vessels. Next, the catheter inlet tube 61 and the right subclavian artery 34 are connected at the connecting section 61a of the inlet tube 61 in the liquid so as to prevent air from entering. Also, the catheter inlet tube 62 and the distal end of the caudal side of the aorta 32 are connected at the connecting section 62a of the inlet tube 62 in the liquid to prevent air from entering. Similarly, the liquid supply pipe 51 from the pump 50 and the inflow tube 31 provided at the apex section of the heart model 30 are connected in the liquid, and then the pump 50 is operated.

Preparations as described above are made, and the catheter operation training is initiated in a state of having a simulated blood flow generated. According to the present embodiment, two kinds of simulations such as a case in which a catheter is inserted through an artery of an arm, and a case in which a catheter is inserted through an artery at the groin can be implemented. In a case in which a trainee simulates catheter insertion through an artery of an arm, the catheter is introduced through the right subclavian artery 34 through the inlet tube 61. The catheter introduced through the right subclavian artery 34 penetrates into the carotid artery 35, passes through the carotid artery 35, and reaches the aorta 32. Subsequently, when the catheter is further inserted, the catheter passes through the aorta 32 and is positioned at the inlet ports 33b of the coronary arteries 33 (corresponding to the entrance to the coronary arteries) that are branched in the vicinity of the connecting section to the main body 30A. At this time, the trainee finds the entrance of either a left or a right coronary artery that serves as an object of insertion (object of treatment) while viewing a coronary artery 33, and performs the operation such that the catheter is engaged to the coronary artery entrance serving as the object. That is, the trainee operates the catheter 60 toward the fine coronary arteries 33 having complicated shapes as illustrated in FIG. 5 while viewing the coronary artery that requires treatment, and engages the catheter 60 to its entrance. Subsequently, the trainee leads a guide wire needed for the treatment to an intended site. Then, a training equivalent to an actual catheter test and surgery (coronary angiography, coronary angioplasty), such as performing vascular dilation by means of a balloon catheter or detention of a stent (metal tube) along the guide wire, can be carried out.

On the other hand, in a case in which a trainee simulates catheter insertion through an artery at the groin, the catheter is introduced through the distal end on the caudal side of the aorta 32 (portion corresponding to the groin) through the inlet tube 62. The catheter passes through the aorta 32, and reaches an inlet port 33b of a coronary artery 33 provided in the vicinity of the connecting section between the aorta 32 and the main body 30A. In this case, the inlet pathway for the catheter is only the path of the aorta 32; however, since junctions with the carotid arteries 35 and 36 and the left subclavian artery 37 exist on the path, on the occasion of operating the catheter, a training for reaching the catheter to the inlet port 33b corresponding to the entrance of the coronary artery can be carried out, while checking the positional relationships with the various simulated blood vessels and the like. A trainee can carry out training for catheter test and surgery similarly to the case of performing the training through a blood vessel of an arm as described above.

When the catheter simulator described above is used, the whole apparatus can be simplified and made compact, and the production cost can be reduced. Furthermore, the catheter simulator can be used under X-ray illumination as well as under no illumination, and by regulating the flow rate-regulating valves 35a, 36a and 37a, a blood flow having the same flow rate as the coronary blood flow of an actual human being (pulsatile flow caused by a liquid) can be passed through the coronary arteries. Since the heart model itself pulsates, the direction and pressure of the liquid flow become physiological. Therefore, the same blood flow as that employed when an actual cardiac catheter treatment, for example, transcatheter aortic valve replacement (TAVI or TAVR), has been implemented can be reproduced, and a training more suitable for the practice can be applied. Furthermore, since the heart model is in a floating state in the liquid, the heart model can reproduce the heartbeat caused by a pumped blood flow. Thus, simulation for detaining a stent in a pulsating coronary artery, which has been believed to be technically difficult for catheter surgery, can now be carried out.

Furthermore, since the heart model 30 can be produced based on CT images of an actual patient or based on individual cases, on the occasion of performing coronary artery imaging using a catheter, coronary angioplasty, aortic aneurysm stent graft insertion, transcatheter aortic valve replacement or the like, pre-surgery simulation can be carried out for each case. According to the present invention, since the heart model can be simply replaced, an environment for training as a general-purpose model for practice can be provided to beginners such as medical students or medical interns, while training of cases with high difficulties can also be provided to skilled experts. That is, a heart model can be formed based on cardiac CT image data that have been obtained beforehand, and a surgery can be simulated before an actual surgery.

An exemplary embodiment of the catheter simulator related to the present invention has been described; however, the present catheter simulator can also be used for the training of catheter operation in organs other than the heart, for example, cerebral blood vessels or abdominal blood vessels. These organs can be arranged by connecting the organs on the path of the aorta 32 described above. For example, in the case of adopting a configuration of connecting a brain model to a distal end of the carotid artery 35 on the opposite side of the connecting section to the aorta 32, training for a catheter operation and a treatment using various devices such as a coil and a stent in the cerebrovascular region can be realized. Also, in the case of adopting a configuration of connecting an abdominal blood vessel model or a lower limb blood vessel model on the caudal side of the aorta 32, training for a catheter operation and a treatment using various devices such as a coil and a stent directed to an abdominal vascular region or lower limb blood vessels can be realized.

Next, the imaging method for catheter simulation related to the present invention will be described with reference to FIG. 5. A catheter 60 is inserted into a coronary artery 33 provided on the surface of the main body 30A of the heart model 30 floating in the liquid (base agent) filled in the container 20, by an operation such as described above. In this state, when a simulated X-ray contrast agent (injection agent) is injected through the catheter 60, as illustrated by symbol A in FIG. 5, the position, shape or the like of the coronary artery 33 become directly visually recognizable due to the color of the injection agent.

In this case, the injection agent can cause a trainee to recognize the coronary artery part as long as the injection agent is simply an agent having a color tone, for example, an ink; however, if the training process is repeated, the injection agent is gradually accumulated in the heart model 30 and hinders the training process. Therefore, in the present invention, the injection agent injected by the catheter 60 and the liquid (base agent) filled in the container 20 are formed from materials which together undergo a chemical reaction when the injection agent is injected, and cause the injection agent to undergo a change in the color to the same color as that of the liquid. When a transparent material is used as the liquid filled in the container 20 in consideration of visibility of the heart model, an injection agent which is colored and turns transparent when the injection agent and the base agent undergo a chemical reaction, may be used in combination with the liquid.

For example, according to the present embodiment, a liquid containing iodide ions having an easily recognizable color (red brown), for example, a povidone iodine solution, is used as the injection agent. Regarding the liquid (base agent) filled in the container 20, a colorless transparent aqueous solution containing water and a thiosulfate, for example, HYPO-ALCOHOL, is used. That is, since the povidone iodine solution injected through the catheter chemically reacts with HYPO-ALCOHOL in a short period of time after injection and turns colorless and transparent, even in a case in which the trainee uses the injection agent continuously over several times, the trainee does not have to worry about retention of the injection agent. Also, since the liquid does not undergo discoloration or clouding, there is no need to exchange the liquid. In regard to the actual concentration of the liquid, when about 0.05% by weight of a surfactant and about 0.2% by weight of HYPO-ALCOHOL, which is an alcohol for reducing iodine, are incorporated into about 25 L of water, the catheter can smoothly move inside a blood vessel, and the angiography can be comprehended by the povidone iodine solution that is injected.

The povidone iodine solution and HYPO-ALCOHOL mentioned above are both chemical agents that have been widely distributed in the clinical field, and are inexpensive with easy handleability. Therefore, catheter simulation can be carried out more effectively at low cost. Meanwhile, in a case in which training is carried out under X-ray illumination, a generally used X-ray contrast agent, for example, an iodine-based X-ray contrast agent that is colorless and transparent and has a high X-ray shielding ratio, may be used.

Furthermore, in the imaging method described above, since an aqueous solution containing an alcohol is used as the liquid, the liquid is highly likely to generate gas bubbles. When such gas bubbles attach to the blood vessel parts of the heart model 30, there is a possibility that the imaged blood vessels may become partially thinner (blood vessels may not be accurately recognized), or the catheter operation may be affected. Particularly, when silicone is used as a material for the heart model, since silicone has a property of repelling water, gas bubbles are likely to be generated at the surface area (PVA is highly hydrophilic, and therefore, gas bubbles are not easily generated compared to silicone).

Therefore, before the alcohol is dissolved in water, measures are taken, such as boiling water once and slowly returning the temperature of water to normal temperature; or reducing the pressure of water to a pressure immediately before the vapor pressure. Alternatively, countermeasures are taken, such as forcibly generating gas bubbles in an ultrasonic washer or the like when gas bubbles are generated by mixing water with the alcohol. Thereby, generation of gas bubbles can be suppressed.

Thus, the catheter simulator related to the present invention has been described; however, the present invention is not intended to be limited to the embodiments described above and can have various modifications. For example, the shape of the container 20 can be varied as appropriate. In regard to the holder 40, the position of retaining the heart model or the overall configuration can be varied as appropriate. Also, in regard to the pump 50 that produces a pulsatile flow, it is not necessary to limit the pump to a particular configuration, as long as the pump can circulate the liquid filled in the container 20, and can cause the pulsatile flow to flow in from the apex section of the main body 30A of the heart model 30.

Furthermore, the imaging method related to the present invention is not limited to the Example for the heart model, and can also be applied to catheter simulators using different organ models and blood vessel models.

EXPLANATIONS OF LETTERS OR NUMERALS

10 CATHETER SIMULATOR
20 CONTAINER

30 HEART MODEL
30A MAIN BODY
31 APEX SECTION
32 AORTA
33 CORONARY ARTERY
33a DISCHARGE PORT FOR CORONARY ARTERY
40 HOLDER FOR INSTALLING HEART MODEL IN LIQUID
50 PUMP
60 CATHETER

The invention claimed is:

1. A catheter simulator comprising:
a container filled with a liquid and including a discharge port and an inflow port;
an elastic heart model installed in the container in a state of having the container filled with the liquid, the heart model being provided with an apex section, coronary arteries with discharge ports opened into the container, and an aorta; and
a pump connected to the apex section of the heart model through the inflow port and producing a pulsatile flow from the apex section to the aorta by means of the liquid so that the liquid is discharged into the container from the heart model through the discharge ports of the coronary arteries,
wherein the liquid sent from the pump is supplied to the apex section of the heart model through the inflow port, and is discharged into the container from the heart model through the discharge ports of the coronary arteries, the liquid discharged into the container being returned to the pump to thereby circulate the liquid in one direction from the pump through the heart model and an inside of the container back to the pump.

2. The catheter simulator according to claim 1, wherein the heart model is formed from a transparent resin or a translucent resin.

3. The catheter simulator according to claim 1, further comprising a holder for retaining an apex section side and an aorta side of the heart model.

4. The catheter simulator according to claim 1, wherein the pump has a function of outputting a pressure of 300 mmHg at a maximum 20 to 200 times per minute, and producing a pulsatile flow.

5. The catheter simulator according to claim 2, wherein the pump has a function of outputting a pressure of 300 mmHg at a maximum 20 to 200 times per minute, and producing a pulsatile flow.

6. The catheter simulator according to claim 1, wherein blood vessels that branch from the aorta are provided, and the blood vessels are provided with flow rate-regulating valves.

7. The catheter simulator according to claim 1, wherein the heart model is produced based on cardiac data of individual patients, and has a function of enabling pre-surgery simulation for each of individual cases.

8. The catheter simulator according to claim 2, wherein the heart model is produced based on cardiac data of individual patients, and has a function of enabling pre-surgery simulation for each of individual cases.

9. The catheter simulator according to claim 4, wherein the heart model is produced based on cardiac data of individual patients, and has a function of enabling pre-surgery simulation for each of individual cases.

10. The catheter simulator according to claim 5, wherein the heart model is produced based on cardiac data of individual patients, and has a function of enabling pre-surgery simulation for each of individual cases.

11. The catheter simulator according to claim 1, wherein the catheter simulator has a function of enabling another organ model to be connected to a circulation path of the aorta.

12. The catheter simulator according to claim 1, wherein the aorta includes carotid arteries with flow-regulating valves, and a left subclavian artery with a flow-regulating valve so that the flow-regulating valves of the carotid arteries and the left subclavian artery are regulated to regulate a pressure and a flow rate of the liquid flowing into the heart model.

* * * * *